Sept. 24, 1946.　　　　　Z. T. WALTER　　　　　2,408,245
MOLD AND METHOD OF FORMING PLASTICS THEREON
Filed April 9, 1943
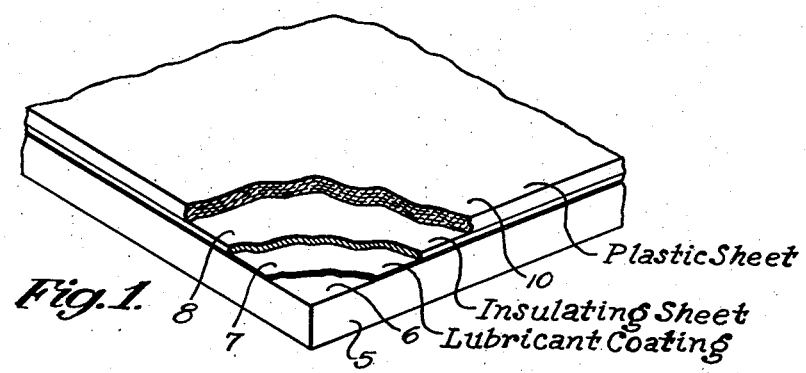
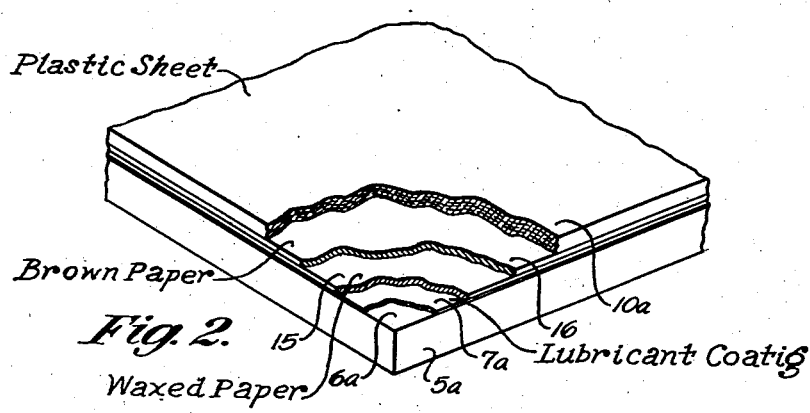
Inventor
Zachary T. Walter.
Attorney.

Patented Sept. 24, 1946

2,408,245

UNITED STATES PATENT OFFICE 2,408,245

MOLD AND METHOD OF FORMING PLASTICS THEREON

Zachary T. Walter, Los Angeles, Calif.

Application April 9, 1943, Serial No. 482,407

3 Claims. (Cl. 154—110)

This invention relates to molds and methods of forming plastic products thereon, and in its more particular aspects it relates to means and method of preventing plastic articles from adhering to the mold.

For instance, in the formation of a plastic product in accordance with my copending application Serial Number 398,300, filed June 16, 1941, wherein laminated plastic products are formed on a mold by applying thereto fabric sheets impregnated with a colloidal volatile solution containing a cellulose ester or the like and suitable solvents therefor, the adhesive qualities of the solute causes the product to adhere firmly to the mold after the solvent has evaporated from the solution and it is difficult and sometimes impossible to separate the product from the mold without serious injury to the product. It is important in the formation of such products that no adherence of the product to the mold take place.

It is therefore an object of the present invention to provide a method and means for preventing adherence of the product to the mold and to facilitate stripping the product from the mold without injury.

How these objects as well as other objects and advantages inherent in my invention are achieved will be best understood from the following description of a preferred adaptation thereof, and for this purpose I shall refer to the accompanying drawing, in which:

Fig. 1 is a fragmentary perspective view partly in section showing an application of my invention; and Fig. 2 is a similar view showing a variational form of my invention.

In the drawing, the numeral 5 denotes a mold which may be constructed of any desired material and shape and having a matrix surface 6. The first step in carrying out my invention is to apply to the surface 6 a coating 7 of a suitable lubricant such as petrolatum, although other lubricants may be used. Next I apply to the mold, over the lubricant coating, a thin, flexible preformed insulating sheet 8. Preferably sheet 8 is of a material capable of being combined as a unitary part of the final product. For instance, if the plastic product 10 (to be later described) is made of a cellulose composition, I prefer to have sheet 8 comprised of a cellulose film—a desirable commercial product suitable for this purpose being Ethofoil, an ethylcellulose film, and preferably this film should be of a thickness of from 1 to 3 thousandths of an inch. Particularly when used on molds having curved or angular surfaces it is highly desirable that the sheet 8 be sufficiently flexible that it may conform exactly to the matrix surface of the mold. I find that the lubricant coating causes the sheet 8 to adhere sufficiently to the mold to temporarily retain it in position on the mold while forming the product thereon.

After the sheet 8 is thus applied, the mold is then ready for forming thereon the plastic product 10, which, in accordance with my said copending application, may be formed by superposing successive laminae of woven fabric, such as jute, impregnated with a colloidal volatile solution containing ethyl cellulose and suitable solvents therefor, allowing each successive lamina to set before superposing thereon the next successive lamina.

When product 10 has been applied and allowed to set, the sheet 8 becomes an integral part of or lining for the product and thus the product may be stripped from the mold without any difficulty or injury.

In Fig. 2, I illustrate a variational form of my invention. There the mold 5a, the matrix surface 6a and lubricant coating are the same as before described. In this form, however, I first apply to the mold, over the lubricant coating, a sheet of waxed paper 15 and I superpose over this sheet 15 a sheet of ordinary brown paper 16 onto the exposed surface of which I apply the product 10a which may be as before described. In this procedure I find that the sheet 16, being absorbent, will substantially absorb any of the solute which might otherwise come in contact with the matrix surface 6a, but in practice a very small portion of the solute is apt to pass through the sheet 16, in which event the wax on the sheet 15 prevents the product from adhering to the mold and the wax so plasticizes the solute in contact therewith that there is no tendency for the sheet 16 to adhere to the sheet 15. Thus the product may be stripped from the sheet 15, sheet 16 adhering to the bottom surface of the product 10a. If desired, the sheet 16 may be removed from the product as by rubbing or by any of the well-known methods, or other sheets of material may be substituted for sheet 16 in cases where it is desired that sheet 16 remain as a lining for the product.

While I have resorted to considerable detail in explaining this specific adaptation of my invention, I wish it understood that, in its broader aspects as defined by the appended claims, the invention is subject to various modifications.

I claim:

1. The method of forming a plastic product on a mold which comprises superposing on the mold a waxed sheet, superposing on said sheet a sheet of absorbent material and applying the plastic to the exposed surface of the last-mentioned sheet.

2. The method of forming a plastic product upon a mold, comprising first lining the mold with a waxed sheet, superimposing on the waxed sheet a sheet of absorbent paper, superimposing upon and bonding to the latter sheet a product-forming fabric sheet impregnated with an adhesive plastic material, and curing the last-named sheet.

3. The method of forming a plastic product upon a mold, comprising first lining the mold with a waxed sheet, superimposing on the waxed sheet a sheet of absorbent paper, superimposing upon and bonding to the latter sheet a product-forming fabric sheet impregnated with an adhesive plastic material, stripping the last-named two sheets from the waxed sheet and finally removing the absorbent sheet from the fabric sheet.

ZACHARY T. WALTER.